United States Patent
Zornik

[19]
[11] Patent Number: 6,077,607
[45] Date of Patent: Jun. 20, 2000

[54] BRAKE/CLUTCH DISC, SUCH AS FOR A VEHICLE

[76] Inventor: Miklavz Zornik, Finzgarjeva 20, 64 248 Lesce, Slovenia

[21] Appl. No.: 08/873,969

[22] Filed: Jun. 12, 1997

[30] Foreign Application Priority Data

Jun. 14, 1996 [DE] Germany ............... 296 10 498 U

[51] Int. Cl.[7] .................. B32B 9/00; C23C 16/32; C23C 16/44; B05D 1/18; C01B 31/04
[52] U.S. Cl. ............... 428/408; 428/698; 427/249; 427/294; 427/430.1; 264/29.1; 188/218 XL
[58] Field of Search .................... 428/408, 446, 428/698; 427/228, 249, 294, 430.1, 431; 264/29.1, 29.5, 29.7; 188/218 R, 218 XL

[56] References Cited

U.S. PATENT DOCUMENTS

| | | | |
|---|---|---|---|
| 3,925,577 | 12/1975 | Fatzer et al. | 427/249 |
| 4,318,955 | 3/1982 | Kulakov et al. | 428/235 |
| 4,837,073 | 6/1989 | McAllister et al. | 428/212 |
| 5,462,800 | 10/1995 | Yamazaki et al. | 428/408 |
| 5,678,809 | 10/1997 | Nakagawa et al. | 267/148 |

FOREIGN PATENT DOCUMENTS

| | | |
|---|---|---|
| 0228166A1 | 7/1987 | European Pat. Off. . |
| 0300756A1 | 1/1989 | European Pat. Off. . |
| 0492436A2 | 7/1992 | European Pat. Off. . |
| 05170537 | 7/1993 | European Pat. Off. . |
| 0642040A1 | 3/1995 | European Pat. Off. . |
| 2653665A1 | 6/1977 | Germany . |
| 3933715A1 | 4/1990 | Germany . |
| 4438456A1 | 5/1996 | Germany . |
| 1457757 | 12/1976 | United Kingdom . |
| WO95/26941 | 10/1995 | WIPO . |

OTHER PUBLICATIONS

Derwent Publications Ltd., London, GB; Class A32, AN 93–121619 XP 002022702.

*Primary Examiner*—Terrel Morris
*Assistant Examiner*—Cheryl Juska
*Attorney, Agent, or Firm*—Seed Intellectual Property Law Group, PLLC

[57] ABSTRACT

In known SiC/C—C composites the SiC layer is implemented as a diffusion layer so that Si occurs even comparatively far within a C—C basic body having an SiC boundary layer. The present invention aims at providing friction discs consisting of an Sic/C—C composite and having essentially the mechanical properties of C—C discs but a longer service life and a broader field of use than said C—C discs. This is achieved by a graphitized, machined basic body (2) provided with an SiC coating consisting of a subsequently applied melt. In addition, a manufacturing method for such discs is provided.

16 Claims, 3 Drawing Sheets

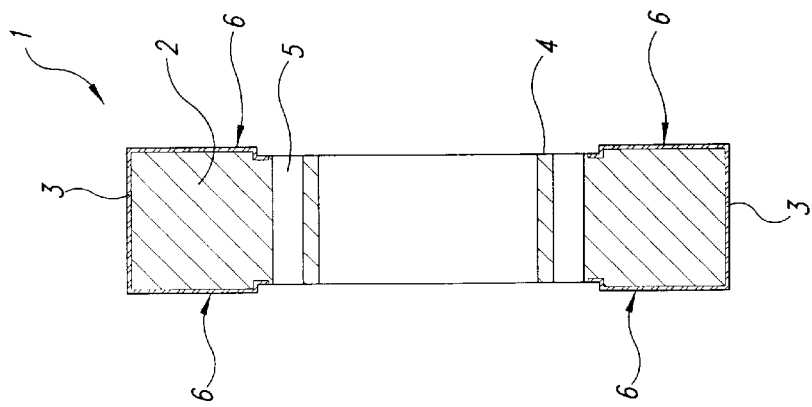
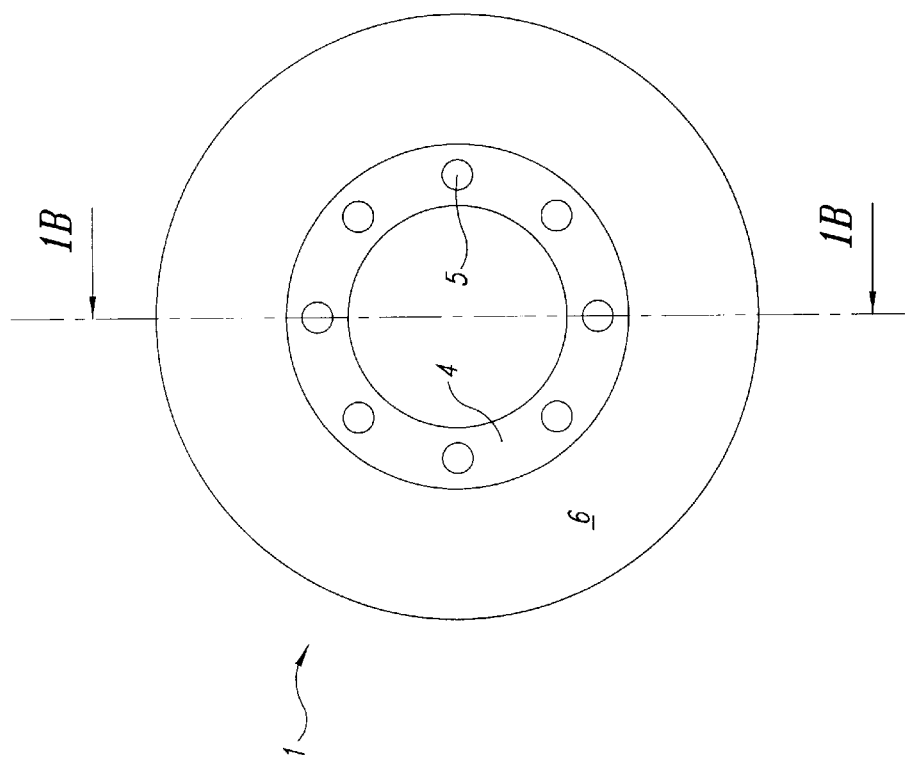

BRAKE/CLUTCH DISC, SUCH AS FOR A VEHICLE

BACKGROUND OF THE INVENTION

The present invention refers to a vehicle brake disc or a vehicle coupling or clutch disc having a carbon—carbon composite body and a silicon carbide coating, and to a method of manufacturing such a disc.

In the field of vehicle construction, carbon—carbon composites ("C—C composites") have been used up to now only for structural components of high-performance racing cars which are subjected to high temperatures. C—C composites are a special type of composite material which resembles carbon fibre-reinforced plastic materials to a certain extent. In contrast to these plastic materials, C—C composites consist of a carbon fibre substrate which is embedded in a carbon matrix.

The development of these materials has been started approximately in 1958 by the American air force for aeroplanes and by NASA. It was in connection with the space shuttle that these materials were used on a large scale for the first time.

Although both components of C—C composites, i.e. the fibre component and the filler component, consist of carbon, the behaviour of the material essentially depends on the state of the carbon of the respective component. Crystalline carbon, i.e. graphite, consists of closely joined hexagonal crystals which are arranged in layers and which are held together by Van der Waals forces. In addition to its defined forms, graphite and diamond, carbon can assume a large number of intermediate states in a quasi-crystalline form, from an amorphous, vitreous carbon to a highly crystalline graphite. The anisotropy of the individual carbon crystal permits a large number of combinations between the two carbon components of the composite.

For the fibre component, threads, bands or fabrics are used. The highest strength is achieved by a straight orientation of the fibres. For most technical applications, fabrics are, however, used, said fabrics being normally two-dimensional (2-D) fabrics. If a high strength in all three directions of space is required, it is also possible to use fabrics that are woven in three directions of space, i.e. 3-D fabrics.

The materials used as a matrix material are thermoplastic materials, pitch, phenolic resins and gaseous hydrocarbons.

One method of manufacturing C—C composites comprises the steps of modelling the intended workpiece from fibre material and filling its pores with carbon. For this purpose, the preformed workpiece is introduced in a furnace and exposed to a hyrocarbon gas, normally methane. In the course of this process, the carbon deposits in the fabric. At temperatures in the order of 1,100° C., the deposited carbon has an isotropic structure and is referred to as pyrolytic carbon. Between 1,000° C. and 1,700° C., the deposited carbon has an intermediate-state microstructure which becomes increasingly graphitic as the temperature increases. At deposition temperatures between 1,700° C. and 2,300° C., graphite is deposited, said graphite being also referred to as pyrolytic graphite.

This process, which is also referred to as CVD (chemical vapour deposition) process in the literature, is very slow and necessitates that the process parameters are adjusted with high accuracy. Normally, it takes several weeks to finish a single part.

A second manufacturing method comprises the steps of hardening carbon fibre-reinforced ploymer structures and of converting this material then into the carbon state in an inert atmosphere at temperatures of approx. 850° C. to 1,000° C. The heating phase for converting the material into the carbon state is normally approx. 1 week. Pure C—C composites produced according to this method are already used in the production of brakes.

A C—C composite of higher density (p>1.95 g/cm$^3$) is obtained by a high temperature/high pressure process in the case of which a fabric is first impregnated with a highly carbonaceous material and is then converted into the carbon state at high temperatures. Although this method permits a great variety of microstructures, it is used very rarely because of the equipment and the safety measures required for generating the high pressure.

In contrast to metal and ceramic materials, C—C composites do not lose their strength even at high temperatures. High thermal conductivity and a low coefficient of thermal expansion make C—C composites resistant to strong temperature variations. In spite of their excellent high-temperature properties, C—C composites have only been used for brakes of aeroplanes and racing cars as well as for heat barriers of spacecraft and for rocket jets so far. A more frequent use of these materials has hitherto been limited by the fact that, in addition to the extremely high manufacturing costs, these materials begin to oxidize at temperatures of approx. 400° C. For the above-mentioned former cases of use, this circumstance was unproblematic in view of the fact that the materials were always used for a limited period of time, but it prevented a long-term use of said materials, e.g. in standard type cars.

Although it has already been suggested to coat C—C composites so as to improve the oxidation behaviour, an acceptable composite system permitting e.g. the use of C—C composites in internal combustion engines has not been found so far. One of the main difficulties arising in connection with the coating is that damage, e.g. cracks in the coating, is caused due to the different thermal expansion behaviours of the C—C composite and of the coating material. Up to now, only approx. 10 to 15% of all C—C composites are actually protected against oxidation.

Up to now, silicon ceramics have primarily been used for the coating; these silicon ceramics permit, however, only a thermal load of the workpieces of less than 1,700° C. The use of a coated C—C composite for heat barriers is known from space shuttles. In this case, silicon was diffused into intermediate-state carbon in an inert atmosphere at 1,760° C. Subsequently, the material was impregnated with tetraethylorthosilicate (TEOS), hydrolyzed and heat-treated, whereby an silicon dioxide ("SiO$_2$") coating having a thickness of approx. 0.5 mm was produced. This method is, however, very complicated from the technical point of view so that these materials are not suitable for use in the case of mass-produced parts. The same applies to the use of CVD processes for applying silicon carbide ("SiC") or silicon nitride ("Si$_3$N$_4$") coatings to intermediate-state C—C composites.

In racing cars, only pure, uncoated C—C composites have, in practice, been used for the brakes up to now. On the one hand, the friction coefficient of such brakes at room temperature is not sufficiently high for permitting a satisfactory braking behaviour. On the other hand, an increased amount of oxidation occurs at high temperatures so that the operating range of the hitherto used C—C vehicle brake discs is between 400° C. and 600° C. It is therefore necessary to warm the vehicle brakes up prior to use, i.e. to drive a warm-up lap with a racing car. Hence, such brakes have not been suitable for use in standard type cars up to now, or they would require a complicate temperature control. Due to the high abrasion behaviour, the brake discs, moreover, wear very rapidly and must normally be exchanged after one race, consequently. The statements made hereinbefore apply, mutatis mutandis, also to clutch discs.

A brake disc of the type mentioned at the beginning is known from JP-A-5 059 350. The coating of said brake disc is, however, produced in that a C—C workpiece is heated in a poisonous silicon oxide ("SiO") atmosphere to temperatures of 1,300° to 2,3000 so that an SiC layer is produced on the surface, or the whole workpiece is converted into a C—C/SiC composite. The Sic layer produced in this way is a diffusion layer. This is evident from the fact that the concentration of the silicon content decreases from the surface of the workpiece to the interior thereof only gradually, this being shown, by way of example, on the basis of curve "a" in FIG. 4. SiC in the interior of a workpiece is, however, undesirable in view of the poor thermal conductivity of SiC. In addition, the mechanical properties of the C—C composite within the brake disc are impaired.

The manufacturing method known from JP-A-5 059 350 is also disadvantageous insofar as the diffusion of SiC takes place during the conversion of the structure of the C—C workpiece. During the conversion process major dimensional changes occur, which can only be compensated for at the finished workpiece in the case of said JP-A-5 059 350. Due to the accuracy required with regard to the parallelism of the braking surfaces and the high hardness of SiC, this necessitates very complicated finishing processes.

Further C—C workpieces having an SiC surface layer are known from DE-A1-26 53 665 and EP-A1-0 300 756. In both cases, said Sic surface layers are diffusion layers having the above-mentioned drawbacks. In view of fact that diffusion processes require a long period of time, the above-mentioned methods are very slow and not suitable for series production.

SUMMARY OF THE INVENTION

It is therefore the object of the present invention to produce a vehicle brake disc or a vehicle coupling disc which consists of a C—C/SiC composite and has essentially the mechanical properties of discs consisting of a pure C—C composite, but which has a longer service life and a broader field of use than the last-mentioned discs. It is also the object of the present invention to provide a method of manufacturing workpieces from a C—C/SiC composite which permits an efficient production of e.g. the above-mentioned discs.

In connection with the vehicle brake discs or the vehicle coupling discs of the type mentioned at the beginning, this object is achieved in that the disc comprises a graphitized, machined basic body and an SiC coating consisting of a subsequently applied melt.

By applying SiC or Si in liquid form to the basic body, the period of time in which said basic body is in contact with the Si or SiC environment can be reduced as far as possible so as to prevent an undesirable diffusion of SiC into the C—C composite and, consequently, a change of the mechanical properties of said C—C composite. Hence, the whole basic body will remain graphitic.

By means of the coating, the abrasive behaviour of the vehicle brake discs or vehicle coupling discs is improved substantially so that a long-term use of such vehicle brake discs or vehicle coupling discs is now possible as well. Due to the substantially lower abrasion that is achieved in comparison with vehicle brake discs or vehicle coupling discs consisting of a pure C—C composite, the brake clearance and the clutch pedal clearance can be held constant for a long period of time so that frequent readjustments may be avoided. In addition, the response behavior may remain constant over a prolonged period of time.

When used e.g. in racing cars, the brake or coupling discs according to the present invention can now be used for several races. On the basis of the now uncritical oxidation behaviour, the temperature window, within which the brakes or couplings are used, is essentially enlarged. Also a use in standard type cars is thus possible. In comparison with conventional vehicle brake discs consisting of steel, a substantial amount of weight is saved in view of the lower density of the C—C composite in comparison with steel. This density is approx. 1.4–1.9 g/cm$^3$ in comprison with steel that has a density of 7.9 g/cm$^3$. As far as their size is concerned, the vehicle brake discs consisting of a C—C composite can be dimensioned like vehicle brake discs made of steel. The steel brake discs currently used in racing cars have a thickness of approx. 29 to 30 mm. On the basis of the high structural stiffness of the C—C composite, this thickness can be reduced to 19 mm in contrast to brake discs made of steel, the thickness in the area of the screw-joint surfaces being approx. 10 to 11 mm. This applies, in principle, also to standard type cars. Like the lower density, also the reduced thickness contributes to a further reduction of weight. The vehicle brake discs according to the present invention can also be used in rail vehicles; in this case, diameters up to 500 mm and disc thicknesses up to 60 mm are possible. These statements apply, mutatis mutandis, also to coupling discs.

For the basic body, a matrix consisting of a C—C composite in the graphitized state in a highly crystalline form may be used, i.e. a C—C composite which has been produced at a temperature of at least 1,700° C.

In one embodiment of the present invention, a C—C composite is used that has been graphitized at a temperature of 2,000° C.±15° C.

During the crstallization of silicon, a crystals as well as β crystals may form. For practical use, silicon carbide layers are preferred which consists predominantly of α crystals, in the ideal case only of α crystals. Also mixed structures can be used.

In accordance with a preferred embodiment, the silicon carbide coating of the vehcile brake discs or of the vehicle coupling discs can be a dipping bath coating, which is produced by immersing the C—C composite into molten silicon carbide or into molten silicon, or can be produced by an abrupt reaction with the liquid melt in a reaction dipping bath. This embodiment provides a fast production and results. This embodiment results in a coating that will resist the high temperatures which occur in the case of vehicle brakes and which can amount to approx. 2000° C. at certain locations.

It, is also possible to use silicon carbide coatings which are produced by vacuum impregnation. In this case, liquid silicon or silicon carbide is sucked by means of a vacuum through a vehicle brake disc blank consisting of a C—C composite. The impregnation period amounts to approx. 5 minutes and is, consequently, much faster than hitherto used CVD processes. Also the SiC coating produced by vacuum impregnation results in a stability which will resist the above-mentioned temperatures occurring in the case of vehicle brakes.

In both cases, SiC will also penetrate into the structural matrix of the C—C composite for firmly anchoring the SiC coating. This penetration takes, however, only place in the marginal layer of the C—C workpiece, the phase boundary obtained being in this case much more clearly defined than in the case of diffusion processes.

A SiC coating may be used which has been applied at a temperature of 2,200° C. with a tolerance range of approx. 3° C. The blank consisting of the C—C composite and the melt can have the same temperature.

In one embodiment, the thickness of the sic coating is 0.2 to 0.3 mm.

The disc blank can be formed of several layers of superimposed, two-dimensional carbon fabric layers, which are embedded in a carbon matrix in the usual way. In principle, it is, however, also possible to use three-dimensional fabrics or fibre structures produced from small pieces of fibres in an irregular arrangement. In contrast to three-dimensional fabrics, the use of two-dimensional fabrics permits a strength in the direction of the plane of the fabric which is higher than the strength that can be achieved by means of three-dimensional fabrics. Utilizing the anisoptropic properties of the carbon, especially in the graphitized state, the use of two-dimensional fabrics permits an adjustment of the strength properties of the vehicle brake disc or of the vehicle coupling disc in the desired manner according to requirements.

The basic body of the vehicle brake disc or of the vehicle coupling disc can be smoothed, prior to the coating step, at least in a friction surface area on the surface thereof so that complicated finishing steps will not be necessary after the coating. With regard to the low abrasion behaviour of the SiC coating, this allows a manufacturer to maintain a precise parallelism of the friction surfaces and a particularly precise adjustment of the response behaviour of the brakes or of the coupling that can be maintained for a long period of time.

The above-mentioned object is also achieved by a method of manufacturing a workpiece consisting of a C—C/SiC composite, said method comprising the steps of converting a basic body of C—C material first into the graphitized state and applying then a liquid SiC or Si melt to said basic body for forming an SiC coating.

This method can permit a particularly simple and efficient production of C—C/SiC workpieces in a two-stage process. The basic body can be machined simply and very accurately in the graphitized state; in connection with brake discs and coupling discs, this is important with regard to the parallelism of the friction surfaces. Only after this machining, the basic body will be coated with liquid Si or SiC. In view of the fact that a diffusion of SiC into the basic body is not necessary, or even undesired, a short-time contact with the liquid Si or SiC melt will already suffice to produce the coating. In view of the precise machining of the basic body which may have already been carried out prior to the coating step, only slight smoothing of the coating may be necessary after said coating step.

BRIEF DESCRIPTION OF THE DRAWINGS

In the following, the present invention will be described on the basis of a preferred embodiment with reference to the drawing in which FIG. 1(a) is an elevation view of a vehicle brake disc for an automobile according to one embodiment of the present invention.

FIG. 1(b) is a cross-sectional view of the vehicle brake disc of FIG. 1(a), viewed along Section 1(b)–(b).

DETAILED DESCRIPTION OF THE INVENTION

Figure 2:
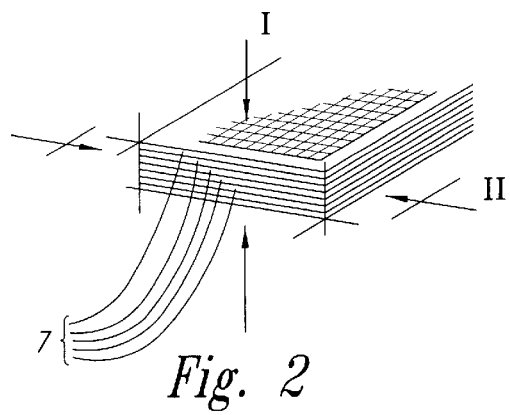
FIG. 2 is an isometric view of a C—C composite material used in the vehicle disc brake of FIG. 1(a).

FIGS. 1(a) and 1(b) show a vehicle brake disc 1 for an automobile according to one embodiment of the present invention. When provided with an appropriate structural design, the vehicle brake disc described hereinbelow can be used as a clutch disc. The disc 1 consists of a basic body 2 produced from a C—C composite and provided with an SiC layer 3 on the outer surfaces thereof. In order to make the drawing clearer, the SiC layer is shown with excessivley large dimensions in the sectional drawing in FIG. 1(b). In practice, however, the thickness of said layer can be approximately 0.2 to 0.3 mm.

The vehicle brake disc is also provided with mounting portions 4 arranged on the two lateral surfaces thereof and used for fastening the brake disc to the vehicle. These mounting surfaces can either be implemented as recesses, which are produced e.g. by turning or which are already formed in the blank, or they can project beyond the lateral surfaces of the brake disc. In the area of the mounting surfaces, holes 5 are provided through which the brake disc can be secured to the vehicle.

In addition, the brake disc 1 has braking surfaces 6 that extend on both sides around the mounting surfaces 4 in an annular configuration. The surfaces of these annular braking surfaces can be smoothed by a grinding process that is repeated several times.

The silicon carbide layer in the embodiment shown can consist of a dipping bath layer comprising predominantly crystals in an a arrangement. The material used for this purpose can be a silicon carbide material, for example, materials having the following properties:

|  |  | Material "A" | Material "B" |
| --- | --- | --- | --- |
| density | g/cm3 | 3.05 | 3.08 |
| coefficient of thermal expansion | $K^{-1}$ | $4.5 \times 10^{-6}$ | $4.4 \times 10^{-6}$ |
| thermal conductivity at 20° C. | W/mK | 150 | 180 |
| thermal conductivity at 1200° C. | W/mk | 40 | 45 |

Figures 3A, 3B:
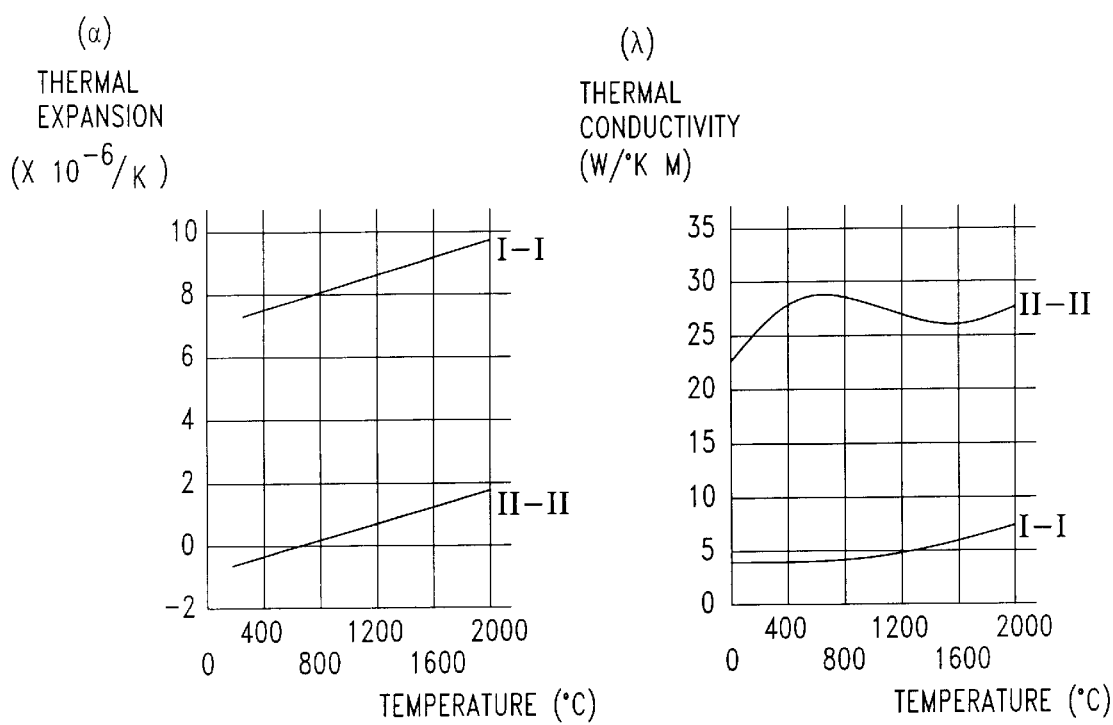
FIG. 3(a) is a graph of the characteristic values of the thermal expansion of the material shown in FIG. 2.
FIG. 3(b) is a graph of the characteristic values of the thermal conductivity of the material shown in FIG. 2.

In FIGS. 3(a) and 3(b), respectively, the amount of thermal expansion α and the thermal conductivity λ of the C—C composite in a graphitized state is separately plotted corresponding to directions I—I and II—II of the fabric as shown in FIG. 2. These values also apply to the C—C/SiC composite. FIG. 2 shows several layers of 2-D fabric, which are arranged one on top of the other, direction I being the direction perpendicular to the plane of the fabric and direction II being the direction in which the fibres of a layer of fabric extend. The 2-D fabrics are preferably arranged such that they extend essentially parallel to the lateral surfaces of the vehicle brake disc so that the anisotropic properties of the thermal conductivity λ are utilized for good heat dissipation in the radial direction.

The fibres used for the fabrics are multifilament fibres comprising between 3,000 and 12,000 filaments per thread according to requirements. In practice, threads comprising 3,000, 8,000 and 12,000 filaments are generally used. The matrix filling material used can be phenolic resin. After two or three re-impregnations, a density of 1.4 to 1.5 g/cm$^3$, preferably 1.42 to 1.48 g/cm$^3$, is obtained for the basic body. The basic body produced in this way has a foam structure which is particularly light in comparison with conventional C—C composites which are produced from compacted fibres and which have a density of approx. 1.9 g/cm$^3$.

Figure 4:
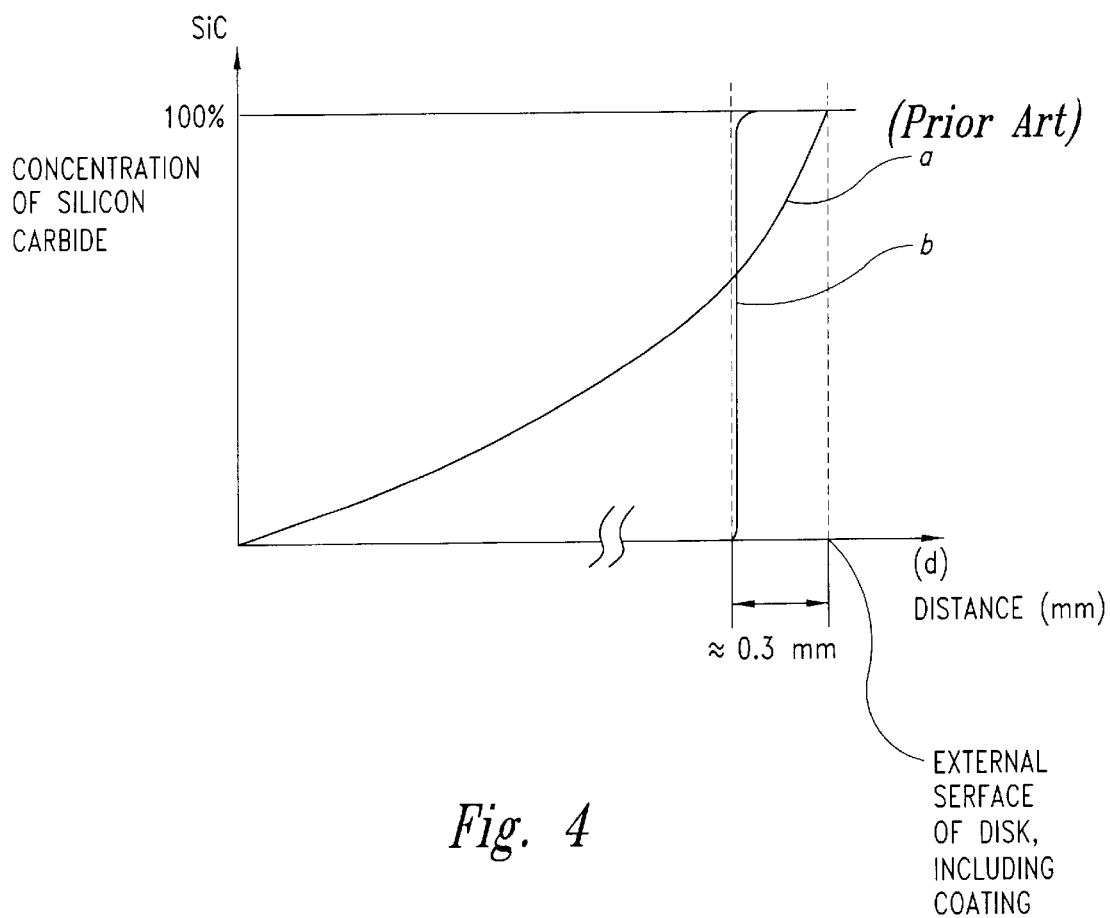
FIG. 4 is a graphical comparison between the SiC concentrations in a C—C workpiece at a distance from the workpiece surface in the case of a known diffusion layer (a) of the prior art and in the case of a coating (b) of liquid melt according to present invention.

As can be seen from FIG. 4, curve "b", liquid melt-coated C—C/SiC composites have a clearly steeper SiC concentration gradient, related to the outer surface of the fully coated workpiece, than workpieces having a diffusion layer.

At room temperature, the dynamic tensile strength of disc 1 is approx. 460 N/mm$^2$. At temperatures above 500°, this tensile strength can increase by more than 30%.

In the following, the production of the disc shown in FIG. 1 will be described.

In one particular method of the present invention, a conventional C—C base material is first produced. This can be done by carbonizing fabrics, which have been impreganted with phenolic resin, at a temperature of approx. 920° to 950° C. If necessary, the fabrics can be re-impregnated with phenolic resin. This material is converted into the graphitized state at a temperature of approx. 1,700° C. to 2,200° C., preferably 2,200° C. ±15° C. Subsequently, the C—C blank is cooled down to room temperature. The blank essentially has the basic shape of the vehicle brake disc. This soft blank can easily be machined by chip-forming methods, e.g. by turning, milling, boring or grinding. In the embodiment shown, the mounting surfaces 4 are produced by turning. The machining is carried out such that the final size, minus the layer thicknes to be applied, is already obtained, since, in contrast to the known coating methods, dimensional changes at the basic body itself no longer occur during the coating step. It is thus possible to observe parallelism tolerances of 0.02 mm in the case of discs having a diameter of 300 mm.

The machined blank is then briefly immersed in a liquid Si or SiC bath, the bath temperature being 2,200° C.±3° C., whereupon it is removed from said bath and cooled down to room temperature. In the course of this process, an Sic coating forms on the surface of the blank. The Sic material also penetrates partly into the matrix of the C—C composite. The penetration depth is low in comparison with diffusion layers and it concerns only the outermost boundary area. It guarantees, however, a firm connection between the Sic coating and the C—C basic body, said SiC coating clinging to the pores of said basic body. The whole production takes place in an inert atmosphere.

In an alternate embodiment, the machined blank is introduced in a furnace. By producing a partial vacuum or a vacuum in said furnace, an Si or SiC melt can be sucked in at a temperature of 2,200° C.±3° C. for impregnating the blank in this way. The impregnating period is approx. 5 minutes. Subsequently, the hot workpiece is cooled down to a temperature of less than 90° C. in the furnace. The cooling rate is normally 3.5° C. to 4° C./min. For accelerating the cooling process in the furnace, a cooling gas, e.g. nitrogen, can be used.

In another alternate embodiment, the coating of the fully graphitized and fully machined basic body with liquid SiC or Si melt can be carried out in a reaction dipping bath. For this purpose, the basic body 2, which has already been fully graphitized, is introduced into a closable carbon crucible and arranged such that, with the aid of supporting elements or little tubes, it is spaced essentially equally from all the interior walls of the crucible. The crucible base is covered with Si or SiC in powder or liquid form. When the crucible has been closed, it is heated to reaction temperature, i.e. to a temperature of approx. 2,200° C. This has the effect that the Si or SiC powder will melt first. When the reaction temperature has been reached, the liquid melt will abruptly deposit on the workpiece, which has been heated as well, and on the inner walls of the crucible. When the reaction has taken place, the coating process can be finished immediately and, after a cooling phase, the fully coated workpiece can be removed from the crucible.

The chemical combination reaction between Si and C—C is pressure dependent and occurs at temperatures between 1,700° C. and 2,200° C. Under a vacuum of approx. $10^{-2}$ N/mm$^2$ (mbar), it will suffice to heat the crucible to a temperature of approx. 1,700° C. to 1,750° C.

The process can also be carried out in an inert atmosphere, e.g. nitrogen. In contrast to known methods, no known poisonous vapours such as SiO are produced.

Vehicle brake discs coated in accordance with these methods are then subjected to fine grinding at least in the area of their braking surfaces 6, the peak-to-valley heights achieved being approx. 8 to 10 μm.

What is claimed is:

1. A vehicle brake/clutch disc comprising a completely graphitized, unitary, carbon—carbon composite body and a single silicon carbide coating on at least a portion of the body, said silicon carbide coating comprising crystals in an α arrangement, and wherein the body of the disc has a contact surface configured to mate with a complimentary surface on the vehicle, the contact surface being smoothed in the graphitized state of said body prior to being coated with said silicon carbide coating.

2. The vehicle brake/clutch disc of claim 1, wherein the silicon carbide coating is a dipped coating.

3. The vehicle brake/clutch disk of claim 2, wherein the silicon carbide layer is a reaction dipped layer.

4. The vehicle brake/clutch disc of claim 1, wherein the silicon carbide coating is a vacuum impregnated coating.

5. The vehicle brake/clutch disc of claim 1, wherein the thickness of the silicon carbide coating is 0.2 to 0.3 mm.

6. The vehicle brake/clutch disc of claim 1, wherein the carbon—carbon composite material has a fiber component and a carbon matrix, the fiber component comprising a plurality of superimposed layers of a two-dimensional carbon fabric, and wherein each layer is completely graphitized.

7. The vehicle brake/clutch disc of claim 1, wherein a portion of the coating covering the contact surface is a smoothed surface.

8. The vehicle brake/clutch disk of claim 1, wherein the silicon carbide coating has a smooth surface.

9. A method of manufacturing a vehicle brake/clutch disc comprising heating a unitary body of carbon—carbon composite material to convert the material to a completely graphitized state, and subsequently applying a single silicon carbide coating to the body in said graphitized state.

10. The method of claim 9, wherein applying the silicon carbide coating comprises placing the body in a dipping bath.

11. The method of claim 10, wherein applying the silicon carbide coating comprises placing the body in a reaction dipping bath.

12. The method of claim 9, wherein applying the silicon carbide coating comprises placing the body in a crucible above a silicon or silicon carbide layer in powder form, and heating the crucible to a temperature at which the silicon or silicon carbide deposits on the body.

13. The method of claim 12, wherein the crucible has a plurality of inner walls, and wherein placing the body in the crucible comprises arranging the body such that the body is spaced essentially equally from all the inner walls of said crucible.

14. The method of claim 9, wherein heating the body of carbon—carbon composite comprises heating the body to a temperature of at least 1,700° C.

15. A method of manufacturing a vehicle brake/clutch disc comprising heating a unitary body of carbon—carbon composite material to convert the material to a graphitized state, and subsequently applying a silicon carbide coating to the body in the graphitized state, wherein applying the silicon carbide coating takes place under at least a partial vacuum and at a temperature of about 1,700° C. to 1,750° C.

16. A method of manufacturing a vehicle brake/clutch disc comprising heating a unitary body of carbon—carbon composite material to convert the material to a graphitized state, and subsequently applying a silicon carbide coating to the body in the graphitized state by placing the body in a dipping bath, wherein applying the silicon carbide coating takes place in an inert atmosphere having substantially atmospheric pressure at a temperature of about 2,200° C.+/−3° C.

* * * * *